US011591036B2

(12) United States Patent
Kinuhata

(10) Patent No.: US 11,591,036 B2
(45) Date of Patent: Feb. 28, 2023

(54) INFORMATION TRANSMISSION DEVICE FOR OPEN MOVING MACHINE

(71) Applicant: KAWASAKI MOTORS, LTD., Akashi (JP)

(72) Inventor: Masanori Kinuhata, Kobe (JP)

(73) Assignee: KAWASAKI MOTORS, LTD., Akashi (JP)

( * ) Notice: Subject to any disclaimer, the term of this patent is extended or adjusted under 35 U.S.C. 154(b) by 78 days.

(21) Appl. No.: 17/265,656

(22) PCT Filed: Feb. 21, 2019

(86) PCT No.: PCT/JP2019/006556
§ 371 (c)(1),
(2) Date: Feb. 3, 2021

(87) PCT Pub. No.: WO2020/039621
PCT Pub. Date: Feb. 27, 2020

(65) Prior Publication Data
US 2021/0316807 A1    Oct. 14, 2021

(30) Foreign Application Priority Data
Aug. 21, 2018   (JP) ............................. JP2018-154900

(51) Int. Cl.
*B62J 50/21*     (2020.01)
*G08G 1/0968*    (2006.01)
(Continued)

(52) U.S. Cl.
CPC ............ *B62J 50/225* (2020.02); *B60W 50/16* (2013.01); *G01C 21/3652* (2013.01); *G08G 1/096872* (2013.01)

(58) Field of Classification Search
CPC ... B62J 50/225; B60W 50/16; G01C 21/3652; G08G 1/096872
(Continued)

(56) References Cited

U.S. PATENT DOCUMENTS

2008/0128190 A1   6/2008  Tsutsumi et al.
2016/0077593 A1*  3/2016  Züger ..................... G06F 1/163
                                                        345/173
2017/0011602 A1*  1/2017  Brav ........................ G08B 6/00

FOREIGN PATENT DOCUMENTS

EP         1927513 A1    6/2008
JP       H07291171 A    11/1995
(Continued)

*Primary Examiner* — Kam Wan Ma
(74) *Attorney, Agent, or Firm* — Alleman Hall Creasman & Tuttle LLP

(57) ABSTRACT

An information transmission device applied to an open moving machine driven by a driver who is exposed to an outside of the moving machine includes: a vibrator configured to vibrate a component of the moving machine, the driver in a driving posture being in contact with the component; and a controller communicably connected to an information providing device and configured to control the vibrator and a voice output device configured to output voice to the driver, the information providing device being configured to provide utterance information to the driver as information to be transmitted to the driver. The controller makes the vibrator operate when making the voice output device output the utterance information to the driver by the voice.

16 Claims, 2 Drawing Sheets

(51) Int. Cl.
  *B60W 50/16* (2020.01)
  *G01C 21/36* (2006.01)
(58) Field of Classification Search
  USPC ...................................................... 340/425.5
  See application file for complete search history.

(56) References Cited

FOREIGN PATENT DOCUMENTS

| | | | |
|---|---|---|---|
| JP | H09169292 | A | 6/1997 |
| JP | 3211125 | B2 * | 9/2001 |
| JP | 2004104684 | A | 4/2004 |
| JP | 2005280487 | A | 10/2005 |
| JP | 2008132910 | A | 6/2008 |
| JP | 2016193660 | A | 11/2016 |
| JP | 2017095089 | A | 6/2017 |

* cited by examiner

INFORMATION TRANSMISSION DEVICE FOR OPEN MOVING MACHINE

TECHNICAL FIELD

The present invention relates to a device configured to transmit information to a driver of an open moving machine. In the present description, a "closed moving machine" denotes a moving machine including a vehicle room enclosed by windows and a ceiling, and a "convertible moving machine" denotes a moving machine including a ceiling which is openable. An "open moving machine" is a moving machine which is different from the closed moving machine and the convertible moving machine and does not originally include a vehicle room which may be enclosed. Examples of the open moving machine include motorcycles, all-terrain vehicles, and personal watercrafts. It should be noted that in the open moving machine, the type of a seat on which a driver is seated is not especially limited and may be a straddle type, a bench type, or a chair type.

BACKGROUND ART

Proposed is a technique by which while a driver is driving a motorcycle, the driver can exchange information regarding traveling with a device mounted on the motorcycle or a device carried by the driver for information input and output (see PTL 1, for example). In PTL 1, information regarding a state of a vehicle rear side, a path guidance, a peripheral road state, and the like is output to a speaker provided in a helmet or a display.

CITATION LIST

Patent Literature

PTL 1: Japanese Laid-Open Patent Application Publication No. 2004-104684

SUMMARY OF INVENTION

Technical Problem

The driver focuses on driving operation. Therefore, even if visual information is output, it is difficult to make the driver easily understand the information transmitted from the moving machine. In the case of the open moving machine, such as the motorcycle, not including an enclosed vehicle room, even if voice information is output, it is difficult to adequately transmit the information to the driver due to influence of wind noise during traveling.

An object of the present invention is to make a driver of an open moving machine easily understand information.

Solution to Problem

An information transmission device for an open moving machine according to one aspect of the present invention is an information transmission device applied to an open moving machine driven by a driver who is exposed to an outside of the moving machine. The information transmission device includes: a vibrator configured to vibrate a component of the moving machine, the driver in a driving posture being in contact with the component; and a controller communicably connected to an information providing device and configured to control the vibrator and a voice output device configured to output voice to the driver, the information providing device being arranged outside the open moving machine and configured to provide utterance information to the driver as information to be transmitted to the driver. The controller makes the vibrator operate when making the voice output device output the utterance information to the driver by the voice.

According to the above configuration, when the voice output device outputs the utterance information provided from the information providing device, the information can be transmitted to the driver through the sense of force without through the sense of sight and the sense of hearing. Therefore, the driver who is focusing on the driving operation of the open moving machine not including an enclosed vehicle room can easily recognize the utterance information.

The controller may change a vibration pattern of the vibrator in accordance with a category of the utterance information provided from the information providing device.

According to the above configuration, the driver can recognize the category of the utterance information by the vibration without depending on the voice.

The controller may change the vibration pattern of the vibrator in accordance with whether the information to be transmitted to the driver is information indicating a state where the information transmission device is ready to receive utterance from the driver or information indicating a state where the information transmission device is about to output utterance to the driver.

According to the above configuration, the driver can recognize whether now is a timing at which the driver should utter to a voice input device or a timing at which the driver should wait for the utterance from the voice output device. Thus, smooth conversation can be performed.

The information providing device may provide, as the information to be transmitted to the driver, route change information of path guidance information, and the controller may change the vibration pattern of the vibrator in accordance with at least one of a route change direction and a distance to a route change position.

According to the above configuration, a traveling navigation function can be realized by vibration transmission.

The controller may shorten a cycle of vibration of the vibrator as the distance to the route change position shortens.

According to the above configuration, the driver can recognize the distance to the route change position by the vibration and therefore can appropriately prepare for the route change.

As the vibration pattern, the controller may changes at least one of magnitude of vibration, a frequency of the vibration, and a cycle of generation and stop of the vibration.

According to the above configuration, the category of the information can be easily expressed by the vibration pattern.

The information provided by the information providing device to the driver may contain weather information regarding weather, incoming signal information indicating that there is an incoming signal of a mobile information terminal carried by the driver, or dangerous spot information indicating a dangerous spot on a route.

According to the above configuration, the information that the driver who is performing the driving operation wants to know can be provided.

The vibrator may vibrate a steering handle manipulated by the driver or a seat on which the driver is seated.

According to the above configuration, the information can be transmitted to the driver by transmitting the vibration to the driver's hand or a buttock.

The open moving machine may be a two-wheeled vehicle. The steering handle may be formed in a hollow bar shape. The vibrator may be arranged inside the handle.

According to the above configuration, the vibration can be appropriately transmitted to the driver's hand while protecting the vibrator.

The open moving machine may be a two-wheeled vehicle. The vibrator may vibrate a step on which the driver puts his/her feet or an on-vehicle member adjacently arranged in front of a seat on which the driver is seated.

According to the above configuration, the vibration can be appropriately transmitted to the driver even if the driver releases his/her hands from the handle.

Advantageous Effects of Invention

The present invention can make a driver of an open moving machine easily understand information.

DESCRIPTION OF EMBODIMENTS

Hereinafter, an embodiment will be described with reference to the drawings.

Figure 1:
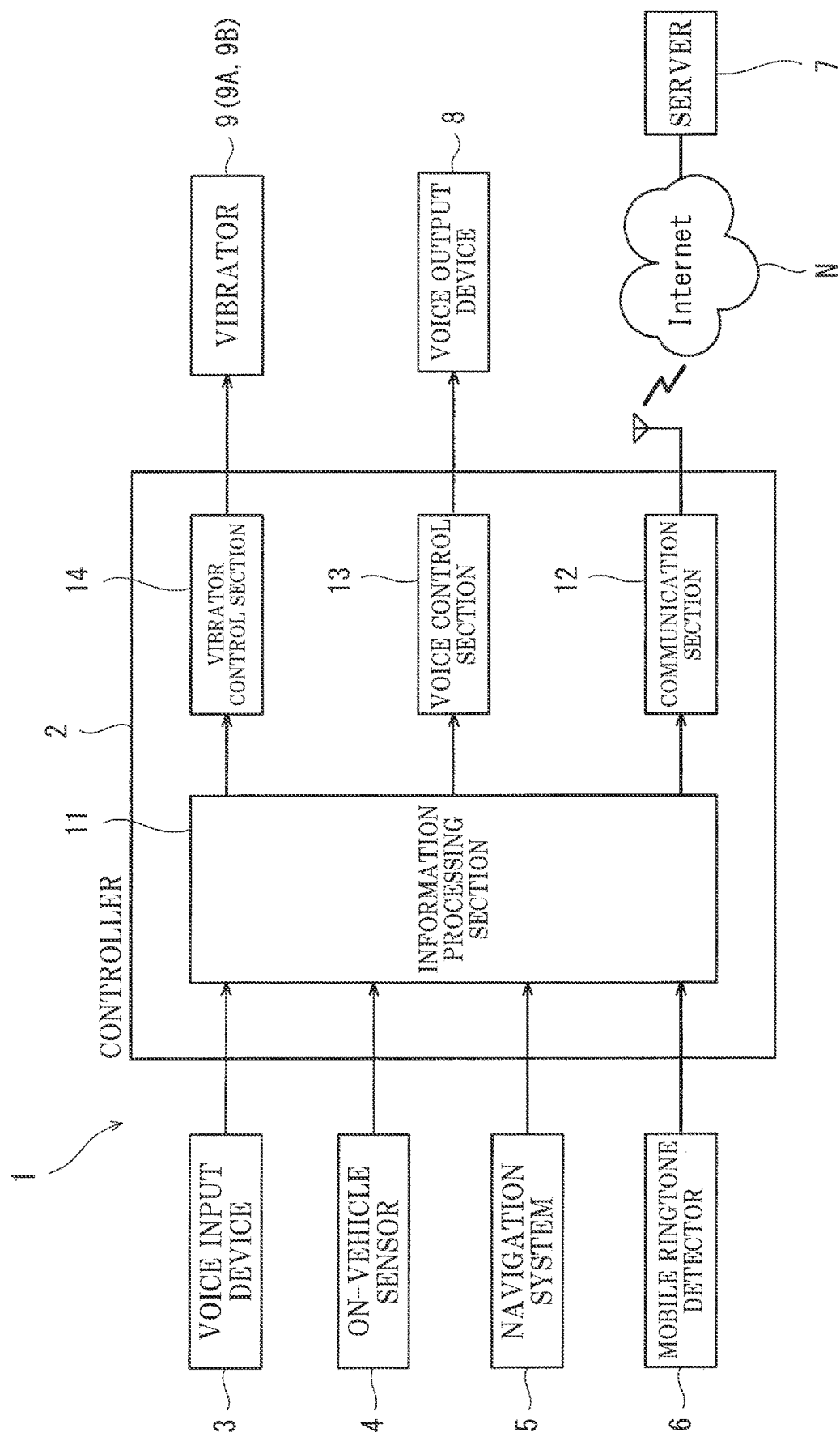
FIG. 1 is a block diagram of an information transmission device according to an embodiment.

FIG. 1 is a block diagram of an information transmission device 1 according to an embodiment. The information transmission device 1 is applied to an open moving machine driven by a driver who is exposed to an outside. In the present embodiment, a motorcycle 20 (see FIG. 2) will be described as a suitable example of the open moving machine.

As shown in FIG. 1, the information transmission device 1 includes a controller 2. The controller 2 includes a processor, a volatile memory, a non-volatile memory, an I/O interface, and the like as hardware, and the non-volatile memory stores a predetermined program. The controller 2 may be a control device mounted on the motorcycle 20 or a mobile information terminal (for example, a smartphone) accompanying the motorcycle 20. When the controller 2 is the mobile information terminal, the processor, volatile memory, non-volatile memory, I/O interface, and the like of the controller 2 are incorporated in the mobile information terminal, and the program is an application program installed in the mobile information terminal. The mobile information terminal may be carried by the driver of the motorcycle 20 or may be provided at a holder of the motorcycle 20.

Input signals are input to the controller 2 from a voice input device 3, an on-vehicle sensor 4, a navigation system 5, and a mobile incoming signal detector 6. The controller 2 is connected to a server 7 (external computer) through a communication network N (for example, the Internet) such that data transmission and reception can be performed therebetween. The controller 2 outputs output signals to a voice output device 8 and a vibrator 9 (9A, 9B) to control the voice output device 8 and the vibrator 9.

The voice input device 3 is, for example, a microphone. The on-vehicle sensor 4 is a sensor configured to detect an operating state of the motorcycle. Examples of the on-vehicle sensor 4 include a vehicle speed sensor, a prime mover (internal combustion engine or electric motor) rotational frequency sensor, and an accelerator operation amount sensor. The navigation system 5 is a known system which refers to GPS information and map information to guide the driver along a traveling path to a destination. The mobile incoming signal detector 6 detects an incoming signal of a phone call, a mail, or the like of the mobile information terminal carried by the driver.

In the present embodiment, the navigation system 5, the mobile incoming signal detector 6, and the server 7 are described as examples of an information providing device which provides utterance information to the driver as information to be transmitted to the driver. Moreover, the controller 2 may serve as the information providing device, or the information providing device may be a function of the controller 2 itself. The information providing device may be the mobile information terminal.

The voice output device 8 is, for example, a speaker or an earphone. The vibrator 9 is mounted on the motorcycle 20. The vibrator 9 receives a vibration command and vibrates a component constituting the motorcycle 20. The component vibrated by the vibrator 9 is a component with which the body of the driver in a driving posture is in contact. Details will be described later with reference to FIG. 2.

The voice input device 3, the on-vehicle sensor 4, the navigation system 5, the voice output device 8, and the vibrator 9 are connected to the controller 2 by wireless connection (for example, Bluetooth (trademark)) or wired connection. When the controller 2 is the mobile information terminal which also serves as a mobile phone, the mobile incoming signal detector 6 is a function of the controller 2 itself. The navigation system 5 may be mounted on the motorcycle or may be provided at the mobile information terminal. When the voice output device 8 is an earphone, the voice output device 8 is connected to the mobile information terminal, which also serves as the controller 2, by wireless connection or wired connection or may be connected to the controller 2, which is mounted on the motorcycle, by wireless connection or wired connection. When the voice output device 8 is a speaker, the voice output device 8 may be a part of the mobile information terminal or may be mounted on the motorcycle.

The controller 2 includes an information processing section 11, a communication section 12, a voice control section 13, and a vibrator control section 14 as software. The information processing section 11 performs various types of information processing based on information input from the voice input device 3, the on-vehicle sensor 4, the navigation system 5, and the server 7 and outputs an output signal, which is a result of the information processing, to the voice control section 13 and the vibrator control section 14. To be specific, the information processing section 11 commands the voice control section 13 to make the voice output device 8 output the utterance information by voice and commands the vibrator control section 14 to make the vibrator 9 operate. The voice control section 13 controls the voice output device 8 to command the voice output from the voice output device 8. The vibrator control section 14 controls the vibrator 9 to command the generation of the vibration of the vibrator 9 and a vibration pattern of the vibrator 9.

The information processing section 11 changes the vibration pattern of the vibrator 9 in accordance with the category of the utterance information input from the navigation system 5 or the server 7 (or in accordance with the category of the utterance information generated by the information processing section 11 based on the detection signal from the on-vehicle sensor 4). Specifically, as the vibration pattern, the information processing section 11 changes at least one of magnitude of the vibration, a frequency of the vibration, a cycle of generation/stop of the vibration, and a position of the vibration. According to this, the driver who felt the vibration from the vibrator 9 can recognize the category of the utterance information without depending on the voice.

The category, content, and the like of the utterance information output from the information processing section 11 vary depending on the type of the information input to the information processing section 11 and the content of processing of the information processing section 11. The following will describe specific examples.

The information processing section 6 provides, for example, a conversation function. Specifically, the information processing section 11 converts the voice, which is uttered by the driver and input from the voice input device 3, into text by a known voice recognition technology and transmits the text as input text to the server 7 through the communication section 12 and the communication network N. The server 7 subjects the input text to syntactic analysis and then subjects the input text to semantic analysis. Then, the server 7 refers to a conversation engine having a determination rule of determining an output text with respect to the input text and generates the output text most suitable for the meaning of the input text. After that, the server 7 transmits the output text to the controller 2, and the information processing section 11 which has received the output text commands the voice control section 13 to make the voice output device 8 output the voice corresponding to the output text and makes the vibrator 9 operate.

In the conversation function, the information processing section 11 operates the vibrator 9 such that the vibration pattern which informs the driver of a state (input stand-by state) where the voice input device 3 is ready to receive the utterance from the driver and the vibration pattern which informs the driver of a state (output preparation state) where the voice output device 8 is about to output the utterance to the driver are different from each other. Moreover, the information processing section 11 may operate the vibrator 9 such that the vibration pattern which informs the driver of a state (input reception state) where the voice input device 3 has received the utterance from the driver is different from the above vibration patterns.

Moreover, as the output preparation state, the information processing section 11 may operate the vibrator 9 such that the vibration pattern which informs the driver of a state (processing state) where processing of determining the content of the utterance from the voice output device 8 to the driver is being performed and the vibration pattern which informs the driver of a state (preparation completed state) where preparation for the utterance from the voice output device 8 to the driver has been completed are different from each other. According to this, the driver can recognize whether now is a timing at which the driver should utter to the voice input device 3 or a timing at which the driver should wait for the utterance from the voice output device 8. Thus, smooth conversation can be performed.

For example, the information processing section 11 may perform predetermined information processing based on the detection signal of the on-vehicle sensor 4, output the voice from the voice output device 8 in accordance with the result of the information processing, and vibrate the vibrator 9 by the vibration pattern corresponding to the category of the content of the voice (for example, the degree of urgency).

When the information processing section 11 receives, from the mobile incoming signal detector 6, incoming signal information indicating that there is an incoming signal of a phone call or mail of the mobile information terminal, the information processing section 11 commands the voice control section 13 to make the voice output device 8 output the voice corresponding to the reception of the incoming signal information and commands the vibrator control section 14 to make the vibrator 9 operate by the vibration pattern corresponding to the reception of the incoming signal information.

The information processing section 11 receives weather information regarding weather, dangerous spot information regarding a dangerous spot on a route, and the like from the server 7 serving as the information providing device. Then, in order to inform the driver of the category of the weather information, the presence of the dangerous spot on the route, and the like, the information processing section 11 commands the voice control section 13 to make the voice output device 8 output the voice corresponding to the information and commands the vibrator control section 14 to make the vibrator 9 operate by the vibration pattern corresponding to the information. It should be noted that the information processing section 11 may receive the dangerous spot information from the navigation system 5.

The information processing section 11 receives route change information of path guidance information from the navigation system 5 serving as the information providing device. Then, the information processing section 11 changes the vibration pattern of the vibrator 9 based on the route change information in accordance with a route change direction (right or left) and a distance from a current position to a route change position. With this, a traveling navigation function is realized by vibration transmission. The information processing section 11 commands the vibrator control section 14 such that the cycle of the vibration of the vibrator 9 shortens as the distance from the current position to the route change position shortens. According to this, the driver can recognize the distance to the route change position by the vibration and therefore can appropriately prepare for the route change.

Figure 2:
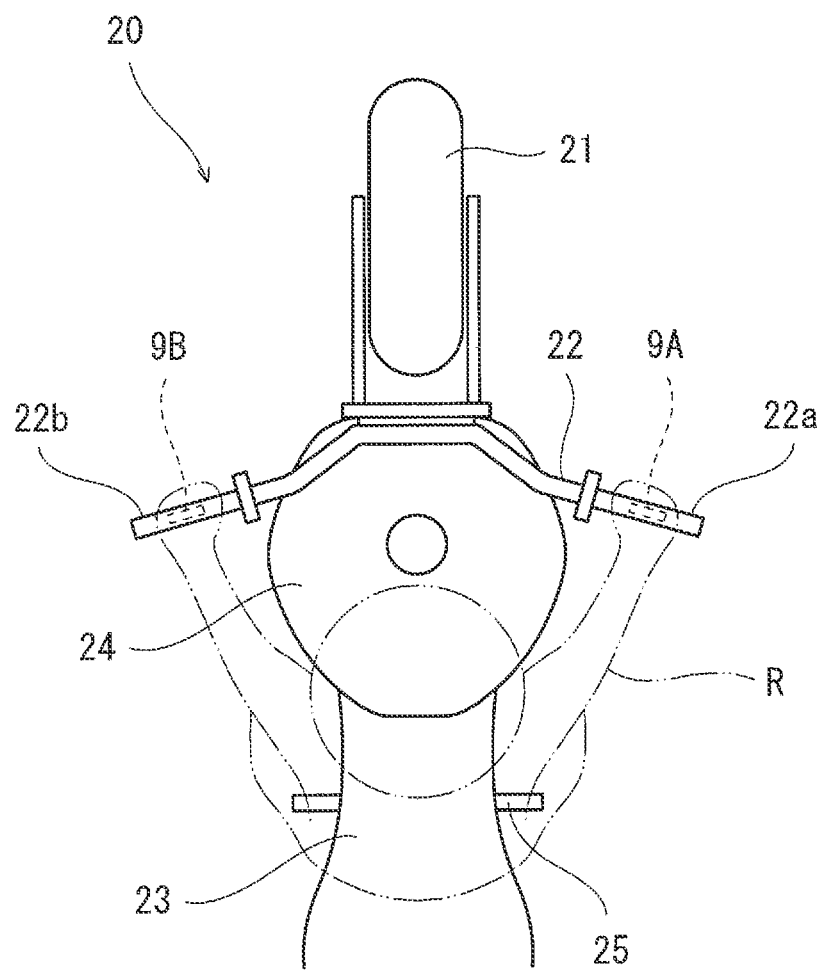
FIG. 2 is a plan view of a motorcycle on which a vibrator shown in FIG. 1 is mounted.

FIG. 2 is a plan view of the motorcycle 20 on which the vibrator 9 (9A, 9B) shown in FIG. 1 is mounted. As shown in FIG. 2, the motorcycle 20 includes: a front wheel 21; a steering handle 22 which manipulates a direction of the front wheel 21; a seat 23 on which the driver is seated; a fuel tank 24 (or a tank cover) arranged between the steering handle 22 and the seat 23 as an on-vehicle member adjacently arranged in front of the seat 23; and a step 25 on which the driver puts his/her feet.

In the example shown in FIG. 2, the steering handle 22 is formed in a hollow bar shape, and a plurality of vibrators 9A and 9B are mounted on the steering handle 22 as the vibrator 9. Specifically, the vibrator 9A is arranged inside a right grip 22a of the steering handle 22, and the vibrator 9B is arranged inside a left grip 22b of the steering handle 22. With this, while protecting the vibrators 9A and 9B from an outside, the vibration can be appropriately transmitted to the driver's hands which are holding the grips 22a and 22b. It should be noted that each of the vibrators 9A and 9B at the grips 22a and 22b may be arranged inside a pipe of the steering handle 22 or be incorporated in an elastic body (for example, a rubber member) externally attached to the pipe. When the vibrator (9A, 9B) is incorporated in the elastic body, a vibration source is close to the driver's hand holding the grip (22a, 22b), and therefore, the vibration is more effectively transmitted to the driver.

In addition, by selectively making only one of the vibrator 9A at the right side and the vibrator 9B at the left side operate, a generation position of the vibration can be changed, and therefore, information regarding the left-right direction can be transmitted to the driver. For example, when the route change information received by the information processing section 11 from the navigation system 5 indicates the right direction as the route change direction, the information processing section 11 commands the vibrator control section 14 to make only the vibrator 9A at the right side operate (without making the vibrator 9B at the left side operate). In contrast, when the route change information received by the information processing section 11 from the navigation system 5 indicates the left direction as the route change direction, the information processing section 11 commands the vibrator control section 14 to make only the vibrator 9B at the left side operate (without making the vibrator 9A at the right side operate). With this, the driver can intuitively recognize the necessity of preparation for the route change in the left direction or the necessity of preparation for the route change in the right direction. It should be noted that instead of or in addition to the steering handle 22, the vibrator 9 may be provided at the seat 23, the fuel tank 24, and/or the step 25. Moreover, in the case of an open moving machine (for example, a utility vehicle) including a driver seat having a backrest portion, the vibrator may be provided at the backrest portion.

According to the above-described configuration, when the voice output device 8 outputs the utterance information toward the driver, the information can be transmitted to the driver through the sense of force without through the sense of sight and the sense of hearing. Therefore, although the noise transmitted to the driver is large while the driver is driving the motorcycle 20, the driver who is focusing on the driving operation can easily recognize the utterance information.

REFERENCE CHARACTERS LIST 1 information transmission device
2 controller
5 navigation system (information providing device)
6 mobile incoming signal detector (information providing device)
7 server (information providing device)
8 voice output device
9 (9A, 9B) vibrator
20 motorcycle (open moving machine)
22 steering handle
23 seat
24 fuel tank (on-vehicle member)

The invention claimed is:

1. An information transmission device applied to an open moving machine driven by a driver who is exposed to an outside of the moving machine,
the information transmission device comprising:
a vibrator configured to vibrate a component of the moving machine, the driver in a driving posture being in contact with the component; and
a controller communicably connected to an information providing device and configured to control the vibrator and a voice output device configured to output voice to the driver, the information providing device being configured to provide utterance information to the driver as information to be transmitted to the driver, wherein
the controller makes the vibrator operate when making the voice output device output the utterance information to the driver by the voice,
the controller changes a vibration pattern of the vibrator in accordance with a category of the utterance information provided from the information providing device, and
the controller changes the vibration pattern of the vibrator in accordance with whether the information to be transmitted to the driver is information indicating a state where the information transmission device is ready to receive utterance from the driver or information indicating a state where the information transmission device is about to output utterance to the driver.

2. The information transmission device according to claim 1, wherein:
the information providing device provides, as the information to be transmitted to the driver, route change information of path guidance information; and
the controller changes the vibration pattern of the vibrator in accordance with at least one of a route change direction and a distance to a route change position.

3. The information transmission device according to claim 2, wherein the controller shortens a cycle of vibration of the vibrator as the distance to the route change position shortens.

4. The information transmission device according to claim 1, wherein as the vibration pattern, the controller changes at least one of magnitude of vibration, a frequency of the vibration, a cycle of generation and stop of the vibration, and a generation position of the vibration.

5. The information transmission device according to claim 1, wherein the information provided by the information providing device contains weather information regarding weather, incoming signal information indicating that there is an incoming signal of a mobile information terminal carried by the driver, or dangerous spot information indicating a dangerous spot on a route.

6. The information transmission device according to claim 1, wherein the vibrator vibrates a steering handle manipulated by the driver or a seat on which the driver is seated.

7. The information transmission device according to claim 6, wherein:
the open moving machine is a two-wheeled vehicle;
the steering handle is formed in a hollow bar shape; and
the vibrator is arranged inside the handle.

8. The information transmission device according to claim 1, wherein:
the open moving machine is a two-wheeled vehicle; and
the vibrator vibrates a step on which the driver puts his/her feet or an on-vehicle member adjacently arranged in front of a seat on which the driver is seated.

9. The information transmission device according to claim 1, wherein the controller makes the vibrator operate in a state where preparation for utterance from the voice output device to the driver has been completed.

10. An information transmission device applied to an open moving machine driven by a driver who is exposed to an outside of the moving machine,
the information transmission device comprising:
a vibrator configured to vibrate a component of the moving machine, the driver in a driving posture being in contact with the component; and
a controller communicably connected to an information providing device and configured to control the vibrator and a voice output device configured to output voice to the driver, the information providing device being configured to provide utterance information to the driver as information to be transmitted to the driver, wherein the controller makes the vibrator operate in a state where processing of determining content of utterance from the voice output device to the driver is being performed.

11. The information transmission device according to claim 10, wherein the controller makes the vibrator operate such that a vibration pattern corresponding to the state where processing of determining content of utterance from the voice output device to the driver is being performed and a vibration pattern corresponding to a state where preparation for utterance from the voice output device to the driver has been completed are different from each other.

12. The information transmission device according to claim 1, wherein the controller makes the vibrator operate in a state where a voice input device has received utterance from the driver.

13. The information transmission device according to claim 1, wherein the controller makes the vibrator operate in a state where a voice input device is ready to receive utterance from the driver.

14. An information transmission device applied to an open moving machine driven by a driver who is exposed to an outside of the moving machine, the information transmission device comprising:

a vibrator configured to vibrate a component of the moving machine, the driver in a driving posture being in contact with the component; and a controller communicably connected to an information providing device and configured to control the vibrator and a voice output device configured to output voice to the driver, the information providing device being configured to provide utterance information to the driver as information to be transmitted to the driver, wherein the controller makes the vibrator operate at a state where preparation for the utterance from the voice output device to the driver has been completed and before making the voice output device output the utterance information to the driver by voice.

15. The information transmission device according to claim 10, wherein the controller makes the vibrator operate when making the voice output device output the utterance information to the driver by the voice.

16. The information transmission device according to claim 14, wherein the controller makes the vibrator operate when making the voice output device output the utterance information to the driver by the voice.

* * * * *